United States Patent

Era et al.

[11] 3,900,385
[45] Aug. 19, 1975

[54] METHOD FOR CONTINUOUS PRODUCTION OF ELECTROLYTIC MANGANESE DIOXIDE

[75] Inventors: Akio Era; Takeo Emoto, both of Tokyo, Japan

[73] Assignee: Mitsui Mining & Smelting Co., Ltd., Tokyo, Japan

[22] Filed: Dec. 11, 1973

[21] Appl. No.: 423,760

[30] Foreign Application Priority Data
Sept. 20, 1973  Japan.............................. 48-106182

[52] U.S. Cl.................................. 204/96; 423/158
[51] Int. Cl............................................ C01b 45/02
[58] Field of Search....................... 204/96; 423/158

[56] References Cited
OTHER PUBLICATIONS
"Solubilities of Inorganic & Metal Organic Compounds," by Seidell, Vol. I, 1940.

*Primary Examiner*—R. L. Andrews
*Attorney, Agent, or Firm*—Armstrong, Nikaido & Wegner

[57] ABSTRACT

Method for continuous production of electrolytic manganese dioxide by electrolysis with an aqueous solution of manganese sulfate-sulfuric acid containing as impurity 30 g/l or more of magnesium in the form of magnesium sulfate while making up for consumed manganese by addition of a neutral aqueous manganese sulfate solution to electrolyte, is improved by concentrating said neutral aqueous manganese sulfate solution under reduced pressure at 40°C – 60°C to the volume corresponding to saturation point at from 15°C to 60°C and then cooling it to 15°C – 25°C. Crystal thus precipitated which mainly consists of magnesium sulfate is filtered away and the filtrate is added to the electrolyte to compensate for the consumed manganese. During electrolysis the concentration of magnesium in the form of magnesium sulfate is maintained at 45 g/l or less for avoiding troubles caused by the accumulation of magnesium sulfate in the electrolyte.

5 Claims, 2 Drawing Figures

METHOD FOR CONTINUOUS PRODUCTION OF ELECTROLYTIC MANGANESE DIOXIDE

The present invention relates to a method for producing electrolytic manganese dioxide, and more particularly to a method for continuous production of electrolytic manganese dioxide while preventing the accumulation of magnesium in the electrolyte, which derives from manganese ore.

In general, the electrolytic manganese dioxide is manufactured by preparing the electrolyte of aqueous manganese sulfate - sulfuric acid solution which is prepared by extracting manganese ores such as manganese carbonate ore (Rhodochrosite) or reducing roasted manganese dioxide ore with aqueous solution of sulfuric acid and electrolyzing said electrolyte using insoluble electrodes such as lead, lead alloy, titanium, or graphite electrodes to deposit manganese dioxide on the anode. The over-all chemical reaction which takes place during the electrolysis is expressed by the following equation:

$$MnSO_4 + 2H_2O \rightarrow MnO_2 + H_2SO_4 + H_2\uparrow$$

In the industrial application, it is advantageous to make up for the consumed manganese by supplying the leaching solution of the manganese ore to the electrolyte either continuously or intermittently to keep the concentration of manganese in the electrolyte substantially constant and to use overflowing electrolyte or spent electrolyte for the leaching of the manganese ore, supplying sulfuric acid thereto, if necessary.

In a typical example of industrial application where electrolysis is carried out continuously, the electrolyte containing 10 – 40 g/l of manganese in the form of manganese sulfate and 20 – 100 g/l of sulfuric acid is used, to which manganese is supplied for making up for the consumed manganese. The manganese dioxide deposited on the anode under the conditions that the electrolyte temperature is 85° – 98°C and the anode current density is 0.7 – 1.2 Amp/dm², is stripped off every 10 to 40 days. The making up for the consumed manganese is carried out by extracting manganese from ore with the spent electrolyte. The amount of manganese to be extracted is equal to that consumed during electrolysis. The extract is fed to electrolytic cell, whereas the same volume of spent electrolyte comes out of the cell.

One of the difficulties encountered in the above industrial method of manufacturing electrolytic manganese dioxide is that the impurities extracted together with manganese with the spent electrolyte are accumulated in electrolyte in the form of sulfate, which spoils the electrolyte and degrades the quality of the product.

The manganese ore which contains 20 – 40 % (by weight) of manganese, usually contains more or less impurities such as heavy metals e.g. iron, alkaline earth metals such as calcium, magnesium and alkali metals such as potassium. These impurities are extracted, during the leaching of the ore, together with manganese. The impurities, particulary iron, can be removed by oxidizing the leached solution with an oxidizing agent such as manganese dioxide, converting $Fe^{2+}$ ion to $Fe^{3+}$ ion, followed by neutralizing the solution by alkali such as lime to the extent of pH 4 – 6 and filtering away the resulting precipitate of iron hydroxide and calcium sulfate together with the leaching residue. In this process other impurities contained in small amount in the ore, such as arsenic, are absorbed on the precipitate and filtered away, but magnesium which is contained in a relatively large amount in the ore remains in the filtrate and cannot be removed fully. Accordingly, in the course of supplying the filtrate, i.e. neutral aqueous manganese sulfate solution, to the electrolytic cell, magnesium sulfate is accumulated in the electrolyte.

With the accumulation of magnesium sulfate in the electrolyte, the specific gravity and the viscosity of the electrolyte increase, impeding the diffusion of ions and causing the reduction of the electric conductivity, which in short disable uniform deposition of manganese dioxide. The tendency appears when the concentration of magnesium exceeds 30 g/l in the electrolyte, and when the concentration exceeds 45 g/l, magnesium sulfate crystallizes not only on the surface of the electrode but also on the liquid surface between the electrodes in piles and push out the electrodes and cause poor electrical contact. Furthermore, the crystallization of magnesium sulfate also takes place even in pipe in which the electrolyte flows, causing serious problems.

The usual way to avoid the above difficulties is to discard a part of the electrolyte in order to prevent the accumulation of magnesium sulfate in the electrolyte. This method, however, is not economical in view of the loss of manganese and the increase of consumption of sulfuric acid and lime which is used as a neutralizer of the discarding electrolyte. Another method has been proposed in which hydrofluoric acid is added to the electrolyte to precipitate magnesium as insoluble magnesium fluoride to be removed. The use of hydrofluoric acid, however, renders the method too expensive.

It is an object of the present invention to provide a method for continuous production of electrolytic manganese dioxide by an economical and simple process while preventing the accumulation of magnesium sulfate in the electrolyte, regardless of the amount of magnesium content in the raw material of manganese ore.

The present invention is based upon the discovery of the fact after an extensive study of the mutual solubility of manganese sulfate and magnesium sulfate in the mixed solution of the two, that magnesium can be continuously removed by concentrating the mixed solution of manganese sulfate and magnesium sulfate at a particular temperature and cooling it down to a particular temperature to thereby separate it into crystal primarily consisting of magnesium sulfate and mother liquor primarily consisting of manganese sulfate.

The present invention provide an improved method for continuous production of electrolytic manganese dioxide by electrolyzing an aqueous manganese sulfate - sulfuric acid solution accompanied with 30 g/l or more of magnesium in the form of sulfate as an impurity, and making up for the consumed manganese by supplying electrolyte with neutral aqueous manganese sulfate solution which is prepared by leaching manganese ore containing magnesium as an impurity with spent electrolyte containing excessive amount of sulfuric acid and then neutralizing it, wherein all or a part of said neutral aqueous solution of manganese sulfate is concentrated under reduced pressure at 40°C – 60°C to the volume corresponding to saturation point of from 15°C to 60°C, then cooled to 15° – 25°C, the resulting crystal mainly consisting of magnesium sulfate is filtered away, and the mother liquor is added to the electrolyte to make up for the all or a part of the consumed manganese, whereby the content of magnesium in the form of magnesium sulfate in the electrolyte is maintained not more than 45 g/l.

Literatures show that in the ternary system of manganese sulfate - magnesium sulfate - water, the ratio of manganese to magnesium in saturated solution varies with the temperature. It is also known that the solubility is rather low at elevated temperature e.g. at 90°C, and that the solubility is the highest in intermediate temperature range i.e. around 50°C, and that solid phase thereof comprises $MgSO_4 \cdot H_2O + MnSO_4 \cdot H_2O$ at higher temperature range, $MnSO_4 \cdot H_2O$ at the intermediate temperature range and $MgSO_4 \cdot 7H_2O$ at lower temperature range ("Solubilities of Inorganic and Metal Organic Compounds" by Atherton Seidell, Vol 1, page 987 (1940), Published by D. Van Nostrand Co.)

The inventors of the present invention have confirmed that in the neutral aqueous manganese sulfate solution said behaviors of the solubility in the intermediate and the lower temperature ranges stood true over a wide range of proportion of manganese sulfate and magnesium sulfate and have found the method of removing a part of magnesium from the neutral solution to be used as a feed solution to the electrolysis.

The present invention will be described in more detail with reference to the accompanying drawings, in which.

Figure 1:
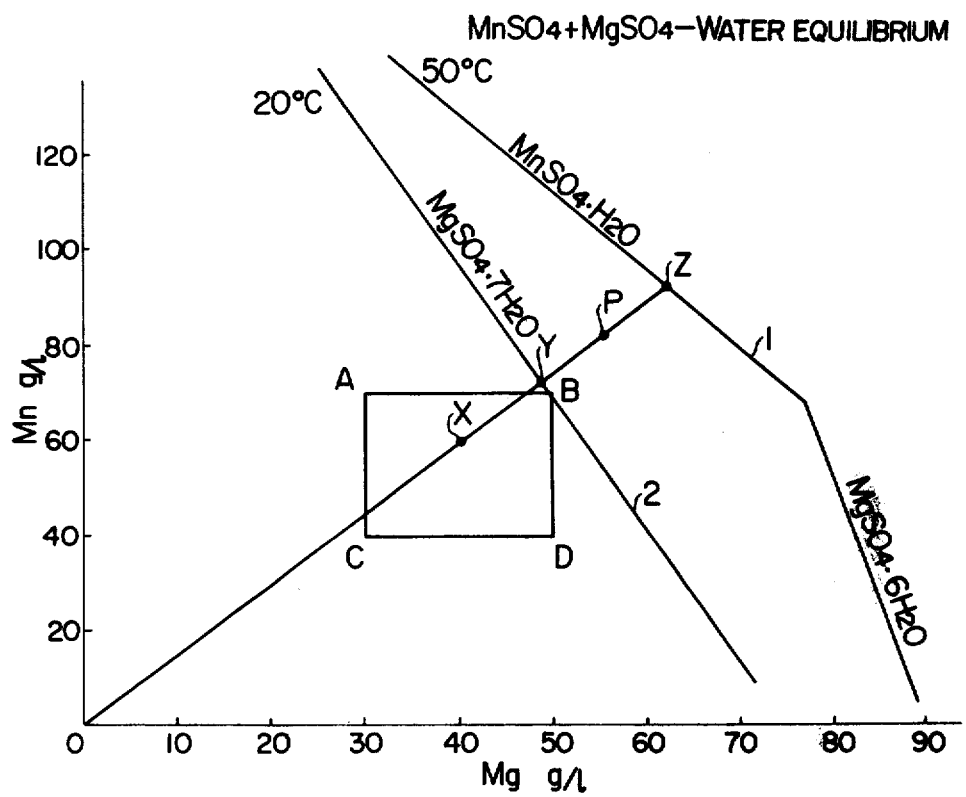
FIG. 1 shows equilibrium curves of the ternary system, manganese sulfate - magnesium sulfate - water, at 50°C and 20°C.

Referring to FIG. 1 where the equilibrium curves of the ternary system, manganese sulfate - magnesium sulfate - water, at 50°C and 20°C are shown, the ordinate stands for the concentration of manganese and the abscissa stands for the concentration of magnesium, and the curve 1 represents the equilibrium at 50°C while the curve 2 represents that at 20°C.

If the neutral aqueous solution having the composition at point X (Mn 60 g/l, Mg 40 g/l) is concentrated at 50°C, the concentration will change as $X \rightarrow Y \rightarrow P \rightarrow Z$ provided that the ratio of Mn to Mg is kept constant. At point Z crystallization begins to take place. The crystal is $MnSO_4 \cdot H_2O$. Since manganese sulfate is crystallized selectively the liquid is enriched with magnesium sulfate with continuing the concentration at that temperature. In the present invention, an end point of the concentration is set at point Z, and when the concentration is carried out to this point, the solution is then cooled to 15° ?- 25°C. If the concentrated solution is gradually cooled to 20°C, for instance, the composition of the crystal deposited at each temperature between 50°C and 20°C varies depending upon the liquid solid equilibrium at that temperature. However, if the cooling is carried out so rapidly that the transient over saturation takes place at the temperature between 50°C and 20°C and crystallization takes place predominantly at 20°C, the composition of crystal thus obtained can be rich in $MgSO_4 \cdot 7H_2O$. If the concentration is carried out to any point P intermediate the points Y and Z, the amount of crystal crystallized at 20°C decreases but the ratio of magnesium to manganese in the crystal increases.

In practicing the present invention the concentration temperature is chosen between 40°C and 60°C, and preferably between 50°C and 60°C. The degree of concentration may be suitably determined by the coordination of the amount of magnesium to be removed and the amount of manganese to be lost, the use of FIG. 1, $MnSO_4$ - $MgSO_4$ - $H_2O$ Equilibrium diagram, is convenient for determining of the degree of concentration depending upon the composition of original solution. For example, if the concentration is to be carried out to the point Z in FIG. 1, the concentration ratio (volume of concentrated solution/volume of original solution) is given by $\overline{OX} / \overline{OZ} \times 100\%$. Similarly the concentration ratio at the point P can be given by $\overline{OX} / \overline{OP} \times 100\%$. The concentrated solution is rapidly cooled to 15°C - 25°C, preferably 20°C - 23°C to precipitate crystal composed mainly of magnesium sulfate.

The present invention can be applied to the solution of any manganese concentration when the accumulation of magnesium in the electrolyte exceeds 30 g/l in the process of manufacturing manganese dioxide by electrolysis of aqueous manganese sulfate - sulfuric acid solution and can be more advantageously applied to the electrolyte used in the industrial continuous process as stated hereinbefore which contains 10 - 40 g/l of manganese and 20 - 100 g/l of sulfuric acid in order to maintain the concentration of magnesium below 30 - 45 g/l, preferably below 30 g/l.

Industrial application of the present invention will now be described with reference to the flow chart shown in FIG. 2.

Pulverized manganese ore is fed in a leaching tank to be leached with the spent electrolyte from electrolytic cell. The amount of manganese in the ore to be fed is equal to that consumed during electrolysis and lost in the processes of leaching and purification. The spent electrolyte contains sulfuric acid sufficient to extract soluble components of the manganese ore as sulfate. Sulfuric acid is, therefore, added as required. The leached solution still exhibits acidic property and it is fed to an oxidation tank together with the leaching residue, where they are brought into contact with powder of manganese dioxide and $Fe^{2+}$ in the leached solution is converted into $Fe^{3+}$. In this process, either electrolytic or natural manganese dioxide can be used as an oxidizing agent. The solution is then delivered to a neutralization tank. In the neutralization tank, limestone is added to neutralize sulfuric acid in the leached solution to precipitate iron as ferric hydroxide. Final pH value in the neutralization step lies between 4 - 6. The neutralized solution is fed to a filter such as filter press to filter away the solid-leaching residue, calcium sulfate and the precipitate of ferric hydroxide.

The neutral aqueous manganese sulfate solution of thus prepared contains 40 - 70 g/l of manganese and 30 - 50 g/l of magnesium in the form of sulfate. The solution also contains calcium sulfate with its saturated concentration and small amount of potassium sulfate. The present invention is applied to this neutral aqueous solution.

In the practice of the present invention, either full volume of or a part of the neutral aqueous solution may be subjected to a de-magnesium treatment. This is determined appropriately depending upon the amount of magnesium permissible to be present in the electrolyte. In general, the amount of magnesium contained in the manganese ore is less than that of manganese. The concentration of magnesium in the electrolyte can be maintained constant by removing magnesium which comes from the ore, hence the amount of solution subjected to the treatment is usually only a small portion as compared with the total amount of the process solution. In this case the making up for the consumed manganese is carried out by adding both untreated solution and treated solution and treated solution from which the crystal containing magnesium has been removed. In the de-magnesium treatment, the amount of manganese lost in the precipitated crystal can be made minimum by a proper combination of the amount of aqueous solution to be processed and the concentration ratio to be applied.

Figure 2:
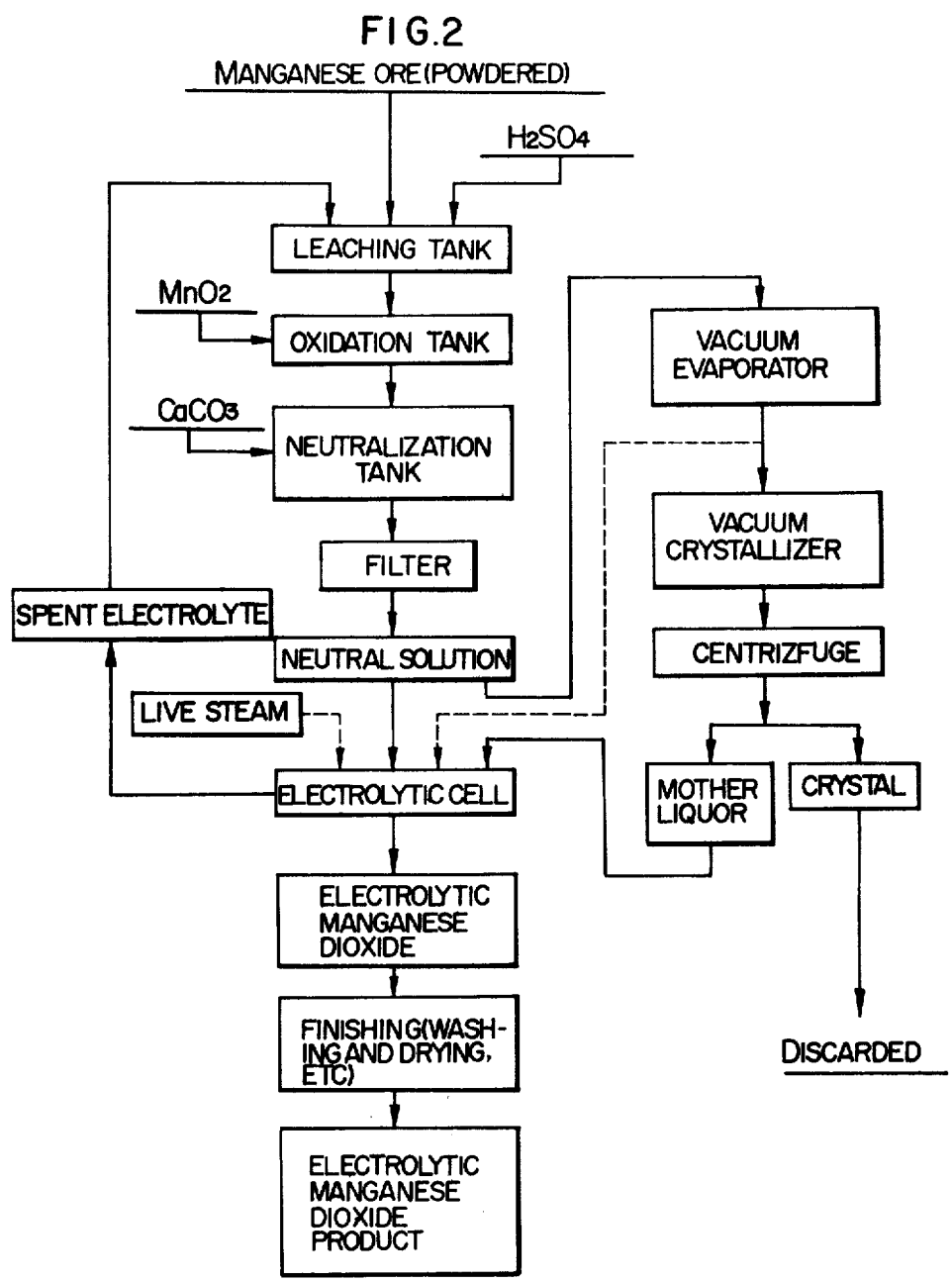
FIG. 2 shows a flow chart illustrating an embodiment of the present invention.

Referring to FIG. 2, a part of the neutral solution is fed to a vacuum evaporator where it is concentrated at 40°C – 50°C, preferably at 50°C and then cooled to 15°C – 25°C, preferably to 20°C. The aimed concentration lies between the liquid composition at the saturation point at 15°C and that at 60°C. For the neutral aqueous solution comprising 60 g/l of Mn and 40 g/l of Mg shown in FIG. 1, for example, the minimum and maximum concentration ratios can be given by $\overline{OX} / \overline{OY} \times 100\%$ and $\overline{OX} / \overline{OZ} \times 100\%$, respectively. The composition corresponding to the area bounded by the rectangular ABCD in FIG. 1 is the typical composition of the neutral aqueous solution in the industrial continuous process, and the concentration ratio for each composition can be determined in a similar manner.

Another advantage of this invention is that the introduction of evaporation process into the electrolytic manganese dioxide manufacturing process makes it easy to control the total volume of process solution. If the heating of the electrolyte in the electrolytic cell is carried out by direct injection of live steam instead of indirect heating with heat exchanging tubes, the volume of the electrolyte increases because of condensation of steam in the electrolyte. Although the direct heating method has many advantages such as elimination of heating tubes, resulting in the reduction of plant construction cost and of maintenance cost as well, the method is hardly applicable without a certain device such as evaporator which can eliminate excess water from the electrolyte. Concentrating more amount of the neutral solution than the amount just corresponding to the amount of magnesium to be removed, using a part of the concentrated solution as it is for supplying to the electrolytic cell and subjecting the other part to de-magnesium treatment, makes it possible to reduce the total volume of the neutral solution to be fed, for the purpose of controlling the total volume of the electrolyte. The dotted lines shown in FIG. 2 illustrate this effect.

The crystal produced in a crystallizer is separated from mother liquor with a suitable separator such as centrifuge. The mother liquor is supplied, together with the remainder of the neutral aqueous solution, to the electrolysis cell.

The electrolysis is carried out under the conditions set forth in accordance with the prior art method, and manganese dioxide deposited on the anode is stripped off, washed and dried to provide final product.

Several examples are given below to make the understanding of the present invention clearer, although it is not intended to limit the present invention to any of the illustrated examples.

EXAMPLE 1

2760 Grams of powdered manganese carbonate ore (consisting of Mn 31.0%, $SiO_2$ 11%, Fe 1%, Ca 4%, Mg 2.8% and K 0.1%, each represented by weight) was leached with 21.2 l of a solution prepared (the sulfuric acid concentration: 115 g/l) by adding sulfuric acid to a spent electrolyte produced during electrolysis (spent electrolyte composition: 23.5 g/l of Mn in form of manganese sulfate, 35.7 g/l of Mg in form of magnesium sulfate and 82.1 g/l of sulfuric acid). The operation temperature was kept at 85°C. Dissolved $Fe^{++}$ was oxidized by adding 10.6 grams of manganese dioxide powder having a size of not more than 150 mesh and purity of 95%. Powder of limestone was then added to render the pH value of the solution to 5.6. The neutralized solution was then filtered to obtain 20.2 l of aqueous solution of manganese sulfate. The composition of the solution was Mn 59.6 g/l, Mg 39.0 g/l, Ca 0.5 g/l and K 0.2 g/l.

The whole volume of the solution was put in a distillation flask and concentrated with at 80 mmHg (vacuum) at 50°C to the extent that the volume of the solution is halved (10 l). The composition of the concentrated solution contained Mn 121 g/l (Mn net content: 1210 g) and Mg 78 g/l (Mg net content: 780 g), the concentration ratio being 50%.

The concentrated solution was then cooled rapidly with a 20 mmHg vacuum at 22°C to precipitate crystal, which was then separated into 9570 grams of crystal and 4.58l of mother liquor by a centrifuge.

The mother liquor contained Mn 132 g/l (Mn net content: 605 g) and Mg 34.5 g/l (Mg net content: 158 g) while the crystal contained Mn 6.3% (Mn net content: 605 g) and Mg 6.5% (Mg net content: 623 g).

The experiment showed that by this method 80% of magnesium was removed while 50% of manganese was lost.

4.58 Liters of the mother liquor (Mn 132 g/l, Mg 34.5 g/l) was then diluted with water to produce 10.08l of feed solution (Mn 60 g/l, Mg 15.7 g/l) for the electrolysis. Electrolysis was carried out by using titanium electrode as anode and graphite electrode as cathode, with 1.0 A/dm² of anode current density, at a temperature of 92°C for 15 days, during electrolysis said feed solution was supplied at the rate of 0.028 l/hr. In order to maintain the electrolytic cell temperature at 92°C, live steam was supplied at 0.006 kg/hr. As a result, a spent electrolyte overflows at 0.032 l/hr (containing Mn 22.2 g/l, Mg 13.7 g/l, $H_2SO_4$ 54 g/l).

During the 15 day electrolysis, the cell voltage was kept at 2.5 – 2.6 V and apparent current efficiency was 100%. The deposition of manganese dioxide was washed, duried to produce the product having a purity of 95%.

Indirect heating with heating tube inserted into the electrolytic cell was applied and temperature was kept at 92°C. The overflowing rate of spent electrolyte was 0.025 l/hr and the composition thereof was Mn 28.4 g/l, Mg 17.6 g/l, $H_2SO_4$ 69.5 g/l.

In the above electrolysis, when the neutral solution (Mn 59.6 g/l, Mg 39.0 g/l) was not concentrated but used as feed solution, and live steam was applied at 0.006 kg/hr, the amount of the overflowing spent electrolyte was 0.032 l/hr and the composition thereof was Mn 22.8 g/l, Mg 34.2 g/l, $H_2SO_4$ 53 g/l. Cell voltage for 15 days was kept at 3.2 – 3.5 V and the current efficiency was 98%. Manganese dioxide deposited.

EXAMPLE 2

9.5 Liters of neutral manganese sulfato solution obtained in the same manner as in the Example 1 was concentrated under the same conditions as in Example 1 but the termination point of the concentration was shortened to abtain 6.25l of concentrated solution. The concentration ratio was, therefore, 65.8%. The composition of the concentrated solution in this case was Mn 90.8 g/l (Mn net content: 565 g) and Mg 59.3 g/l (Mg net content: 370 g). The concentrated solution was then cooled under the same conditions as in Example 1 to precipitate crystal to obtain 2870 grams of crystal (Mn 4.2% (Mn net content: 120 g), Mg 7.2% (Mg net content: 207 g)) and 4.35l of mother liquor (Mn 102.5 g/l, Mg 38 g/l).

This experiment showed that 56% of Mg was removed and Mn loss was as low as 21%.

4.35 Liters of mother liquor was then diluted with water to obtain 7.43l of feed solution (Mn 60 g/l, Mg 22.2 g/l) for the electrolysis. Electrolysis was carried out for 11 days with supplying said feed solution under the same condition as in the Example 1. Results of electrolysis were substantially the same as the Example 1 except that cell voltage was 2.5 – 2.7 V showing the tendency of rising somewhat at the end of electrolysis.

What is claimed is:

1. In a method for continuous production of electrolytic manganese dioxide by electrolysis of an aqueous manganese sulfate - sulfuric acid solution containing 30 g/l or more of magnesium in the form of magnesium sulfate as impurity wherein consumed manganese is made up for by supplying a neutral aqueous manganese sulfate solution prepared by leaching of manganese ore which contains magnesium as impurity with spent electrolyte and sulfuric acid followed by neutralization and filtration;

the improvement comprising concentrating the whole amount of or a part of the neutral manganese sulfate solution in a vacuum at a temperature of between 40°C. and 60°C. to produce a solution having a concentration corresponding to a saturation point at from 15°C. to 60°C., and then rapidly cooling the resultant solution to 15°C. – 25°C., to give crystal containing magnesium sulfate, filtering away the crystal and feeding the filtrate to the electrolytic cell to make up for the whole amount of or a part of consumed manganese, whereby the content of magnesium in the form of magnesium sulfate in the electrolyte is maintained at not more than 45 g/l.

2. Method as defined by claim 1 wherein said spent electrolyte contains 10 – 40 g/l of manganese in the form of manganese sulfate and 30 – 45 g/l of magnesium in the form of magnesium sulfate.

3. Method as defined by claim 1 wherein said neutral aqueous manganese sulfate solution contains 40 – 70 g/l of manganese in the form of manganese sulfate and 30 – 50 g/l of magnesium in the form of magnesium sulfate.

4. Method as defined by claim 1 wherein electrolysis is carried out while blowing in live steam.

5. In a method for production of electrolytic manganese dioxide by electrolysis of an aqueous manganese sulfate - sulfuric acid solution containing 10 – 40 g/l of manganese in the form of manganese sulfate and as impurity 30 – 45 g/l of magnesium in the form of magnesium sulfate, wherein consumed manganese is made up for by supplying a neutral manganese sulfate solution containing 40 – 70 g/l of manganese in the form of manganese sulfate and 30 – 50 g/l of magnesium in the form of magnesium sulfate, said neutral solution being prepared by leaching manganese ore containing magnesium as impurity with a spent electrolyte followed by neutralization and filtration;

the improvement comprising concentrating the whole amount of or a part of said neutral aqueous solution of manganese sulfate in a vacuum at a temperature between 40°C. and 60°C. to produce a solution having a concentration corresponding to a saturation point at from 15°C. to 60°C., and then rapidly cooling the resultant solution to 15°– 25°C., to give crystal containing magnesium sulfate, filtering away the crystal and feeding the filtrate to the electrolytic tank to make up for the whole amount of or a part of consumed manganese, whereby the content of magnesium in the form of magnesium sulfate in the electrolyte is maintained at not more than 45 g/l.

* * * * *